United States Patent
Cope et al.

(10) Patent No.: US 9,466,052 B1
(45) Date of Patent: Oct. 11, 2016

(54) APPLICATION DEVELOPMENT AND EXECUTION FRAMEWORK

(75) Inventors: Warren B. Cope, Olathe, KS (US); Tae-Woo Cha, Overland Park, KS (US); John M. Everson, Leawood, KS (US); Von K. McConnell, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1186 days.

(21) Appl. No.: 12/616,538

(22) Filed: Nov. 11, 2009

(51) Int. Cl.
*G06Q 20/00* (2012.01)
*G06Q 20/08* (2012.01)
*G06F 21/10* (2013.01)

(52) U.S. Cl.
CPC .......... *G06Q 20/085* (2013.01); *G06F 21/10* (2013.01)

(58) Field of Classification Search
USPC ...................................... 705/52, 77
See application file for complete search history.

(56) References Cited

U.S. PATENT DOCUMENTS

| | | | | |
|---|---|---|---|---|
| 7,778,866 B2 * | 8/2010 | Hughes | ..................... | G06F 8/20 705/7.42 |
| 7,865,442 B1 * | 1/2011 | Sowell | ................... | G06F 21/105 705/52 |
| 2005/0149447 A1 * | 7/2005 | Sherkow | ................. | G06Q 10/00 705/52 |
| 2006/0190407 A1 * | 8/2006 | Payne | ..................... | G06F 21/10 705/59 |
| 2007/0033567 A1 * | 2/2007 | Carlson | ..................... | G06F 8/36 717/100 |
| 2008/0134048 A1 * | 6/2008 | Leibow | .............. | G06Q 30/0603 715/738 |
| 2009/0052399 A1 * | 2/2009 | Silver | ............... | H04W 36/0022 370/331 |
| 2010/0114714 A1 * | 5/2010 | Vitek | ..................... | G06Q 30/00 705/14.69 |

OTHER PUBLICATIONS http://web.archive.org/web/20090630010545/http://developer.apple.com/iPhone/program/distribute.html, "iOS Developer Program: 3. Distribute", Apple, Inc., Jun. 30, 2009, Cupertinio, California.

* cited by examiner

Primary Examiner — Tsan-Yu J Huang

(57) ABSTRACT

An application repository is provided. The application repository comprises a first computer having a processor and a memory, a data store, a plurality of applications stored in the data store, and a billing apportionment module stored in the memory. Each application contains an instruction to invoke a run-time license tracking application programming interface (API), the plurality of applications comprising a first application. The billing apportionment module, when executed by the processor, receives a first run-time license tracking report generated by invocation of the run-time license tracking application programming interface by the first application executing on one of a second computer and a mobile electronic device, determines a first application usage fee to bill to an account associated with a user of the first application, bills the first application usage fee to the account associated with a user of the first application, determines a first usage fee share based in part on the first application usage fee and on the first run-time tracking report, and transfers the first usage fee share to an account associated with the first application.

18 Claims, 5 Drawing Sheets

APPLICATION DEVELOPMENT AND EXECUTION FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer programs and/or software may be created to perform limited but useful functions on a wide variety of different processors, for example desktop computers, laptop computers, mobile phones, personal digital assistants (PDAs), media players, and other electronic devices. In some contexts, such software may be referred to as applications and/or "apps." Applications may be developed and tested by individuals and/or small teams of developers working on their own, without the support of an on-going business concern.

SUMMARY

In an embodiment, an application repository is disclosed. The application repository comprises a first computer having a processor and a memory, a data store, a plurality of applications stored in the data store, and a billing apportionment module stored in the memory. Each application contains an instruction to invoke a run-time license tracking application programming interface (API), the plurality of applications comprising a first application. The billing apportionment module, when executed by the processor, receives a first run-time license tracking report generated by invocation of the run-time license tracking application programming interface by the first application executing on one of a second computer and a mobile electronic device, determines a first application usage fee to bill to an account associated with a user of the first application, bills the first application usage fee to the account associated with a user of the first application, determines a first usage fee share based in part on the first application usage fee and on the first run-time tracking report, and transfers the first usage fee share to an account associated with the first application.

In an embodiment, an application repository is disclosed. The application repository comprises a first computer having a processor and a memory, a data store, a plurality of applications stored in the data store, and a billing apportionment module stored in the memory. Each application contains an instruction to invoke a run-time license tracking application programming interface (API), the plurality of applications comprising a first application of a first tier and a second application of a second tier. The billing apportionment module, when executed by the processor, receives a first run-time license tracking report generated by invocation of the run-time license tracking application programming interface by the first application executing on one of a second computer and a mobile electronic device, wherein the first run-time license tracking report identifies the first application as a first tier application. The billing apportionment module further receives a second run-time license tracking report generated by invocation of the run-time license tracking application programming interface by the second application executing on one of the second computer and the mobile electronic device, wherein the second run-time license tracking report identifies the second application as a second tier application. The billing apportionment module further determines a first application usage fee to bill to an account associated with a user of the first application, bills the first application usage fee to the account associated with a user of the first application. The billing apportionment module further determines a first usage fee share based in part on the first application usage fee, on the first run-time tracking report, and on the second run-time tracking report. The billing apportionment module further transfers the first usage fee share to an account associated with the first application, determines a second usage fee share based in part on the first application usage fee, on the first run-time tracking report, and on the second run-time tracking report, and transfers the second usage fee share to an account associated with the second application.

In an embodiment, an application repository is disclosed. The application repository comprises a first computer having a processor and a memory, a data store, a plurality of applications stored in the data store, a billing apportionment module stored in the memory, and a run-time analysis module stored in the memory. Each application contains an instruction to invoke a run-time license tracking application programming interface (API), the plurality of applications comprising a first application. The billing apportionment module, when executed by the processor, receives a first run-time license tracking report generated by invocation of the run-time license tracking application programming interface by the first application executing on one of a second computer and a mobile electronic device. The run-time analysis module, when executed by the processor, receives at least a portion of the run-time license tracking report from the billing apportionment module and analyzes the portion of the run-time license tracking report to one of refine a user profile associated with the second computer or the mobile electronic device and to accumulate marketing statistics.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
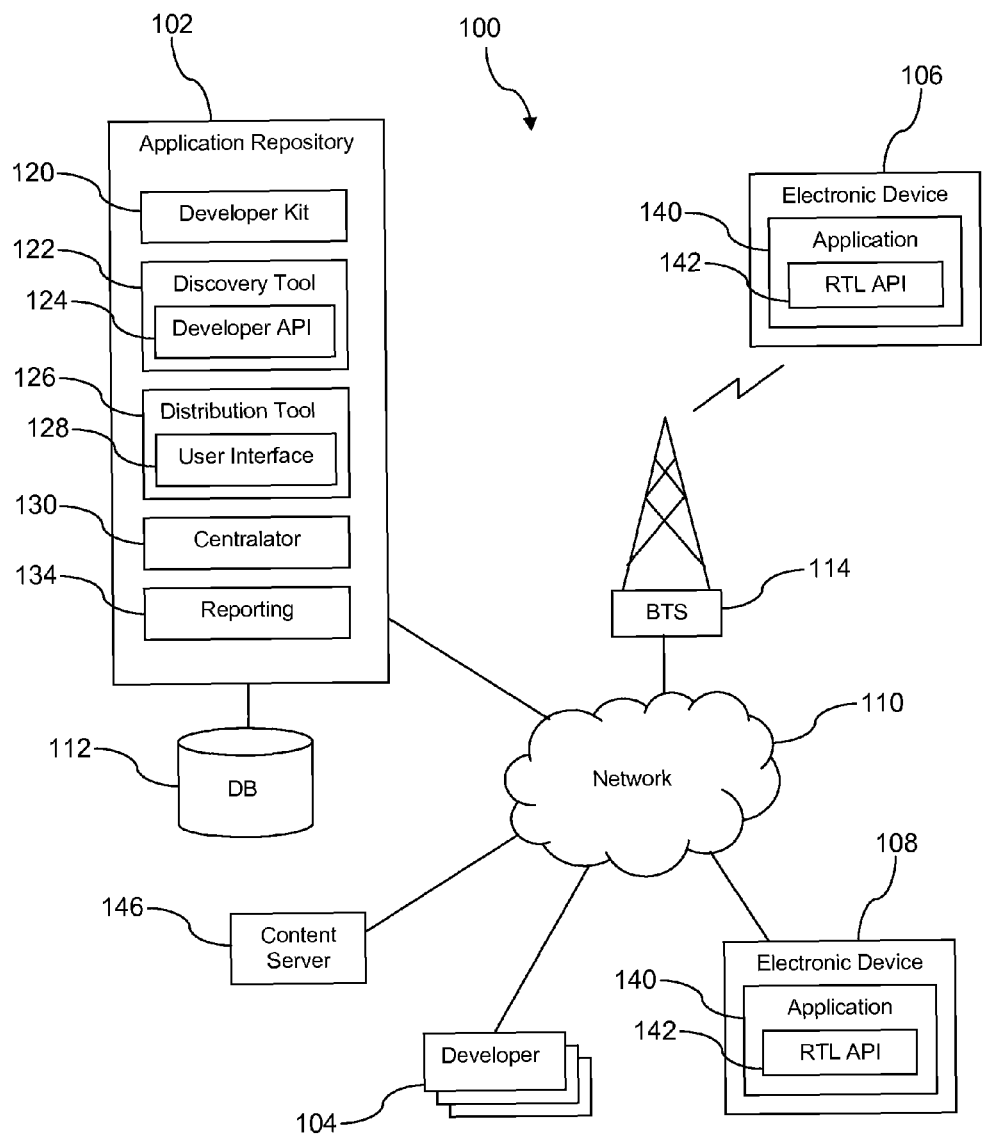
FIG. 1 is a block diagram of an application development and execution framework according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches an application development and execution framework. The current paradigm for developing applications may be referred to as "closed-garden" software development wherein requirements, schedules, deliverables, intellectual property rights may be negotiated between one or more developer organizations and an enterprise, for example a computer company and/or a telecommunications operating company, before any productive software development begins. The "closed-garden" software development approach may comprise the enterprise certifying developers and/or applications before deploying applications to a user community. Applications may comprise software that is composed of one or more software components, one or more subroutines, one or more software modules, one or more classes and/or objects, and one or more link libraries comprised of software components, subroutines, and/or software modules. Applications may be comprised of a plurality of components and some of these components themselves may be comprised of a plurality of components. The composition of components within components may be referred to as nesting of components, and the contained components may be referred to in some contexts as nested components. The application development and execution framework taught by the present disclosure promotes an ecosystem for "open-garden" software development, where developers are not directly coupled with enterprises and where developers may not be certified by the enterprise before development begins or even later. In this ecosystem, innovation and progress may occur more rapidly and more economically than in the "closed-garden" paradigm.

The application development and execution framework provides tools for searching a repository or database of components, for discovering the functionality and features of the contained components, and for composing new applications and/or new components at least in part based on the components stored in the repository. The application development and execution framework provides tools to promote developers identifying and evaluating the suitability of foundational applications and/or componentware, stored in the repository and/or database, from which to construct their own applications. The application development and execution framework provides tools for developers to build automated run-time license tracking into their applications so they can get paid for their development efforts. The application development and execution framework provides access to the tools for developers through a user interface, for example a graphical user interface (GUI) and/or through a web based interface. In an embodiment, the application development and execution framework may provide an application programming interface for developers to access the tools.

The application development and execution framework provides tools for end users to browse applications, to access reviews and/or appraisals of applications by peers, to post reviews of applications, and to download applications stored in an application repository. In an embodiment, the application development and execution framework provides interfaces for the end user to evaluate applications and analyze the costs and/or price points of applications. The application development and execution framework further provides an application that interacts with the applications downloaded from the application repository to determine a usage fee to bill the user for use of the applications, and to determine a usage share of the usage fee to distribute out to one or more developers. By creating an "open-garden" ecosystem that promotes developers receiving a share of the revenues generated by their applications, it is hoped that the variety and the quality of applications available to end users will increase. It is further hoped that the growth of applications may promote communications services growth, for example promoting the growth of wireless data services. For example, developers who would otherwise be reluctant to develop and share software components, perhaps through concerns about being fairly rewarded for their efforts, may be encouraged by the automated and explicitly defined revenue sharing model of the execution framework to diligently develop and offer their software developments.

Turning now to FIG. 1, a framework 100 for application development and execution is described. In an embodiment, the framework 100 comprises an application repository 102, one or more developers 104, a first electronic device 106, and a second electronic device 108 that may communicate via a network 110. In an embodiment, the application repository 102 may be coupled to a data store 112, for example, but not by way of limitation, a database. In an embodiment, the first electronic device 106 may be one of a mobile device selected from a mobile phone, a personal digital assistant (PDA), a media player, and another mobile device. An embodiment of a mobile phone is discussed further hereinafter. In an embodiment, the second electronic device 108 may be one of a desktop computer, a laptop computer, and a tablet computer. Computers are discussed further hereinafter. The network 110 may be provided by a public switched telephone network, a public data network, a private network, and combinations thereof. The framework 100 promotes the efficient and rapid development and distribution of applications developed by developers 104 for use by the electronic devices 106, 108. Additionally, the framework 100 provides a revenue sharing model that provides incentives to the developers 104.

The first electronic device 106 may communicate with the network 110 via a wireless communication link provided by a base transceiver station (BTS) 114. The base transceiver station 114 may provide the wireless communication link with the first electronic device 106 based on one or more of a code division multiple access (CDMA) technology, a global system for mobile communication (GSM) technology, a universal mobile telecommunication system (UMTS) technology, a worldwide interoperability for microwave access (WiMAX) technology, a long-term evolution (LTE) technology, or another wireless communication technology. In some embodiments, in some contexts the first electronic device 106 may be referred to as a WiMAX mobile phone, a LTE mobile phone, a CDMA mobile phone, a GSM mobile phone, or a UMTS mobile phone, depending upon the wireless communication technology employed to establish the wireless communication link between the base transceiver station 114 and the first electronic device 106. Alternatively, a femtocell (not shown) may provide the wireless communication link with the first electronic device 106. In another embodiment, the first electronic device 106 may communicate with the network 110 via a wireless communication link provided by an access point (not shown) based on one or more of a WiFi technology and a Bluetooth technology. In another embodiment, the first electronic device 106 may communicate with the network 110 via a contactless communication link provided by a point-of-sale terminal or other contactless communication terminal. It is understood that in an embodiment, the framework 100 may comprise other numbers of BTS's 114 and other number of electronic devices 106, 108. In an embodiment, the second electronic device 108 may communicate with the network 110 via a wired link. In an embodiment, the second electronic device 108 may communicate with the network 110 via a wireless communication link provided by an access point or a wireless local area network (LAN) base station, wherein the access point or wireless local area network base station is coupled to the network 110 by a wired link.

In an embodiment, the application repository 102 may be implemented on one or more computers. In an embodiment, the application repository 102 comprises a developer kit 120, a discovery tool 122, a distribution tool 126, a centralator module 130, and a reporting module 134 that are stored in one more memories and executed on one or more processors of the application repository 102. While in FIG. 1, the application repository 102 is represented as separate from the data store 112, in another embodiment, the abstraction of the application repository 102 may also be considered to include the data store 112. In an embodiment, one or more of the developer kit 120, the discovery tool 122, the distribution tool 126, the centralator module 130, and the reporting module 134 may be combined. In an embodiment, one or more of the developer kit 120, the discovery tool 122, the distribution tool 126, the centralator module 130, and the reporter module 134 may be implemented as two or more components and/or modules.

The developer kit 120 provides tools for the developers 104 to create applications that may be deposited in the application repository 102 and distributed by the application repository 102. The developer kit 120, for example, may provide tools to promote a developer 104 embedding a real-time license application programming interface (RTL API) in an application, whereby the developer 104 may share in revenue realized from distribution and execution of the application. The developer kit 120 may provide tools to create and edit metadata associated with the application.

The discovery tool 122 may comprise a developer application programming interface 124 that promotes the developers 104 browsing the application repository 102 and/or the data store 112 to identify and research the capabilities of applications stored in the data store 112. The developers 104 may choose to build new applications composed of one or more applications provided by the application repository 102. An application that may be selected by an end user to deploy on the electronic device 106, 108 may be referred to as a first tier application, an accumulative application, and/or a primary application. An application that may be embedded within a first tier application may be referred to as a second tier application, a foundational application, and/or componentware. In an embodiment, a first tier application may call a second tier application, for example an application that determines a location of the first electronic device 106 by interaction with a wireless communication network comprised within the network 110, for example via the wireless communication link provided by the BTS 114, to determine a location of the first electronic device 106. The subject application may use the location of the first electronic device 106 to provide location based services functionality, for example to obtain local restaurant information and/or medical services information from a content server 146. It is understood that, under some circumstances, an application may play the role of both a first tier application and of a second tier application.

The artifacts associated with an application stored in the application repository 102 and/or the data store 112 may include one or more code files and/or binary files needed to build and use the application, for example within an application developed by the developer 104, as well as metadata describing the functionality of the application, the interface of the application, the execution environment prerequisites of the application, a list of target execution devices, a list of devices on which the application has been tested, documentation of testing performed on the application. In an embodiment, the first tier applications and the second tier applications stored in the application repository 102 and/or the data store 112 may be targeted to execute on fourth generation wireless electronic devices, for example on a fourth generation mobile phone. In an embodiment, the metadata may comprise a definition of a revenue sharing model associated with deployment of the application. The revenue sharing model may specify one or more different revenue sharing models including a fixed share per use, a one-time non-exclusive license fee, a percentage of the overall royalty paid by end users, a combination minimum fixed amount plus a percentage of revenues above this minimum, a combination of a percentage of revenues up to a maximum fixed amount, a fixed price per unit of time—for example a fixed price per week, a fixed price per month, a fixe price per year—a progressive share schedule where the revenue share per use is less for higher number of uses per unit time than for lower number of uses per unit time, and other revenue share models.

The metadata may further comprise feedback information from developers 104 who have embedded the subject application in one or more of their applications. The feedback may comprise ratings of the quality and/or efficiency of the subject application, ratings of the ease of integrating the subject application into another application, and ratings of the accuracy of the description of the functionality of the subject application. The feedback information may comprise statistical data describing the number of different applications into which the subject application has been embedded, the number of electronic devices 106, 108 that include the subject application embedded in at least one application stored in the electronic devices 106, 108, the number of times the subject application is invoked per unit of time, the number of times the subject application is invoked on average per application into which the subject application has been embedded, and the like statistical data. The metadata may comprise a listing of all applications into which the subject application has been embedded. The metadata may comprise documentation of testing performed by developers 104 who have embedded the subject application in one or more of their applications.

The distribution tool 126 may comprise a user interface 128 that a user of the electronic devices 106, 108 may use to download a first tier application from the application repository 102, for example from the data store 112. The user interface 128 may provide methods to search the data store 112 for first tier applications to provide a desired functionality. The user interface 128 may promote searching based on categories of functionality, for example shopping functionality, media functionality, gaming functionality, problem solving functionality, and others. The user interface 128 may promote searching based on names and/or keywords.

The user interface 128 may further provide methods to research and evaluate a first tier application before purchasing and/or installing on to the electronic devices 106, 108. The user interface 128 may present user ratings of the first tier application, for example an averaged satisfaction rating, a range of user satisfaction ratings. The user interface 128 may provide textual descriptions and/or reviews provided by users. The user interface 128 may provide a list of target electronic devices on which the subject application may execute. The user interface 128 may present statistics on the number of users who have installed the subject first tier application, how many times per day the subject first tier application is executed, how long the subject first tier application has been released to the application repository 102, how many user problem reports have been reported against the subject first tier application, and the like. The user interface 128 may provide a tool for users to submit reviews and/or comments on first tier applications they have used. In an embodiment, the user interface 128 may authenticate the electronic devices 106, 108 as having previously downloaded and installed a subject first tier application before permitting the electronic devices 106, 108 to submit a review and/or comments on the subject first tier application.

The centralator module 130, hereinafter referred to as the centralator module 130, may provide a variety of mediation functions to support the developer kit 120, the discovery tool 122, the distribution tool 126, and the reporting module 134. Additionally, the centralator module 130 manages the revenue extraction from the electronic devices 106, 108 and the distribution of revenue shares to first tier and second tier applications. In some contexts, the centralator module 130 may be referred to as a billing apportionment module and/or component. In some contexts, the centralator module 130 may be referred to as a run-time analysis module and/or component. Alternatively, in an embodiment, the functionality attributed to the centralator module 130 above may be portioned and allocated to three or more separate modules and/or components.

In an embodiment, the electronic devices 106, 108 may download and install a first application 140 that embeds a call to the real-time license application programming interface. Each time the first electronic device 106 invokes the first application 140, the first application 140 calls and/or executes the real-time license application programming interface 142, and the real-time license application programming interface 142 causes a use log or journal entry to be created. In an embodiment, the first electronic device 106 may transmit the use log associated with the first application 140 to the application repository 102 and to the centralator module 130 proximate to the time that the first application 140 is invoked. Alternatively, the first application 140 may accumulate use logs associated with the first application 140, as well as other applications downloaded to the first electronic device 106, and periodically transmit the accumulation of use logs to the application repository 102, to the data store 112, and/or to the centralator module 130, for example once per day, once per week, once per month, or some other periodic interval. Alternatively, the first application 140 may accumulate use logs and transmit the accumulated use logs to the application repository 102, to the data store 112, and/or to the centralator module 130 in response to a request from the centralator module 130 at a time determined by the centralator module 130. In an embodiment, the use logs may be transmitted to the application repository 102, to the data store 112, and/or to the centralator module 130 in a run-time tracking report. The use logs may include information identifying the first application 140. It is understood that descriptions of the interactions of the first electronic device 106 with the application repository 102 and/or the data store 112 apply equally to the second electronic device 108.

In an embodiment, the first application 140 may be considered to be a first tier application and/or an accumulative application and may encapsulate one or more second tier applications and/or foundational applications, for example the first application 140 may embed calls or invocations of the second tier applications. The second tier applications may each embed a call to the real-time license application programming interface 142. When the second tier application is invoked by the first tier application, the second tier application calls and/or executes the real-time license application programming interface 142, and the real-time license application programming interface 142 causes a use log or journal entry to be created. In an embodiment, the real-time license application programming interface 142 may include information about the terms under which the electronic devices 106, 108 downloaded the subject application in the use log. In an embodiment, the real-time license application programming interface 142 may include information identifying the electronic devices 106, 108 on which the subject application executed and or information identifying a user associated with the electronic devices 106, 108 on which the subject application executed.

The use log created by the call to the real-time license application programming interface 142 by the second tier application may be sent to the application repository 102 and to the centralator module 130 in any of the methods described above. Alternatively, the use log created by the call to the real-time license application programming interface 142 by the second tier application may be combined with the use log created by the call to the real-time license application programming interface 142 by the first tier application. The use log created by the call to the real-time license application programming interface 142 by the second tier application may include information identifying the first tier application that called and/or invoked the second tier application as well as information identifying the subject second tier application.

In some contexts, the real-time license application programming interface 142 may be referred to as a run-time license tracking application programming interface. In the event that a second tier application that is encapsulated in the first tier application is not called during execution of the first tier application, for example, in the case where the call to the second tier application is located in an alternative execution path that is not executed during the subject execution of the first tier application, then the run-time license tracking application programming interface 142 embedded in the second tier application is not invoked and no use log associated with the second tier application is created.

In an embodiment, when the centralator module 130 receives one or more use logs and/or run-time license tracking reports, the centralator module 130 may determine a usage fee associated with executing the first application 140 and bill the usage fee to an account, for example a wireless communication subscription account associated with the first electronic device 106. Alternatively, the first electronic device 106 may have purchased a non-exclusive run-time license to execute the first application 140 for a one time fee, in which case the centralator module 130 may still determine a usage fee associated with executing the first application 140, but not bill the usage fee to the account associated with the first electronic device 106. The usage fee, although not billed, in this case may promote allocating revenue shares to either the developer 104 that developed and deposited the first application 140 in the application repository 102 and/or the data store 112 or that developed and deposited a second tier application invoked by the first application 140.

The metadata associated with the first tier applications, for example the first application 140, and second tier applications stored in the data store 112 may include information defining a billing model and/or a revenue sharing model for use by the centralator module 130 in determining usage fees, billing usage fees, and determining usage fee shares for distribution to the developers 104. The billing model and/or revenue sharing model may be defined by the developer 104 that deposited the subject application, either first or second tier, in the application repository 102 and/or the data store 112. In an embodiment, the centralator module 130 may promote a bidding and/or auction mechanism where an electronic device 106, 108 may transmit a bid and/or offer defining an alternative billing model to the billing model deposited with the subject application by the developer 104 and the developer 104 is notified by the centralator module 130 of the alternative offer to either accept or reject.

The revenue sharing model associated with a first tier application may define a fixed share for each second tier application invoked by the subject application. For example, a first tier application invoking three second tier applications: application A, application B, and application C, may define a revenue share of 20% of the usage fee for each of the three second tier applications, thereby reserving a 40% revenue share of the usage fee to itself. Alternatively, the revenue sharing model associated with the first tier application may define a fixed share between the first tier application and all second tier applications and define the revenue share among the second tier application according to a flexible and/or a dynamic rule. For example, the first tier application may reserve a 40% revenue share of the usage fee to itself and allocate the remaining 60% revenue share to be shared among the second tier applications invoked by the subject first tier application based on how many times each second tier application is invoked. For example, if application A is not invoked, if application B is invoked twice, and application C is invoked four times, the revenue share for application A may be 0% of the usage fee, the revenue share for application B may be 20% of the usage fee, and the revenue share for application C may be 40% of the usage fee. The revenue sharing model defined for the first tier application may be guided and/or constrained by the revenue sharing models previously defined for the second tier applications invoked by the first tier application.

The centralator module 130 further may determine a first usage fee share and deposit funds equal to the first usage fee share in an account associated with the developer 104 that developed and deposited the first application 140 in the application repository 102 and/or the data store 112. In the event that the first application 140 invoked a second tier application, the centralator module 130 further may determine a second usage fee share and deposit funds equal to the second usage fee share in an account associated with the developer 104 that developed and deposited the second tier application in the application repository 102 and/or the data store 112. The centralator module 130 may determine usage fees and usage fee shares based on metadata associated with and/or linked with the first application 140, other first tier applications, and second tier applications stored in the application repository 102 and/or the data store 112. In an embodiment, the centralator module 130 may determine usage fees on a periodic basis, for example hourly, daily, weekly, monthly, quarterly, yearly, or some other periodic basis.

In an embodiment, the reporting module 134 analyzes the usage fees billed to the electronic devices 106, 108 and the usage fee shares distributed to the developers 104 to produce a variety of financial reports and statistical reports. In an embodiment, the reporting module 134 may periodically publish a report identifying and ranking the top ten revenue receiving first tier applications and/or second tier applications. Such a report may promote excitement and engagement among the developers 104, to encourage the developers 104 to continue to develop new, useful applications. Alternatively, in an embodiment, the reporting module 134 may periodically publish a comprehensive report documenting the revenue received from the electronic devices 106, 108 and the distribution of revenue to the developers 104 for all of the first tier and second tier applications stored in the application repository 102 and/or the data store 112. In an embodiment, the reporting module 134 may periodically publish a report identifying and ranking the ten most frequently invoked first tier and/or second tier applications. Alternatively, in an embodiment, the reporting module 134 may periodically publish a comprehensive report documenting the frequency of invocation of all first and second tier applications stored in the application repository 102 and/or the data store 112. In an embodiment, the reporting module 134 may periodically publish a report documenting the number of electronic devices 106, 108 on which each of the first and/or second tier applications are installed. In an embodiment, the reporting module 134 may periodically publish other reports based on analyzing the usage of the application repository 102. Publishing any of the reports identified above may comprise transmitting an email including the subject information to any of the developers 104, the devices 104, 106, and others. Publishing any of the reports identified above periodically may comprise daily publishing, weekly publishing, monthly publishing, quarterly publishing, yearly publishing, or some other periodic interval effective for informing the user community and the developer community of the status of the application repository 102.

Figure 2:
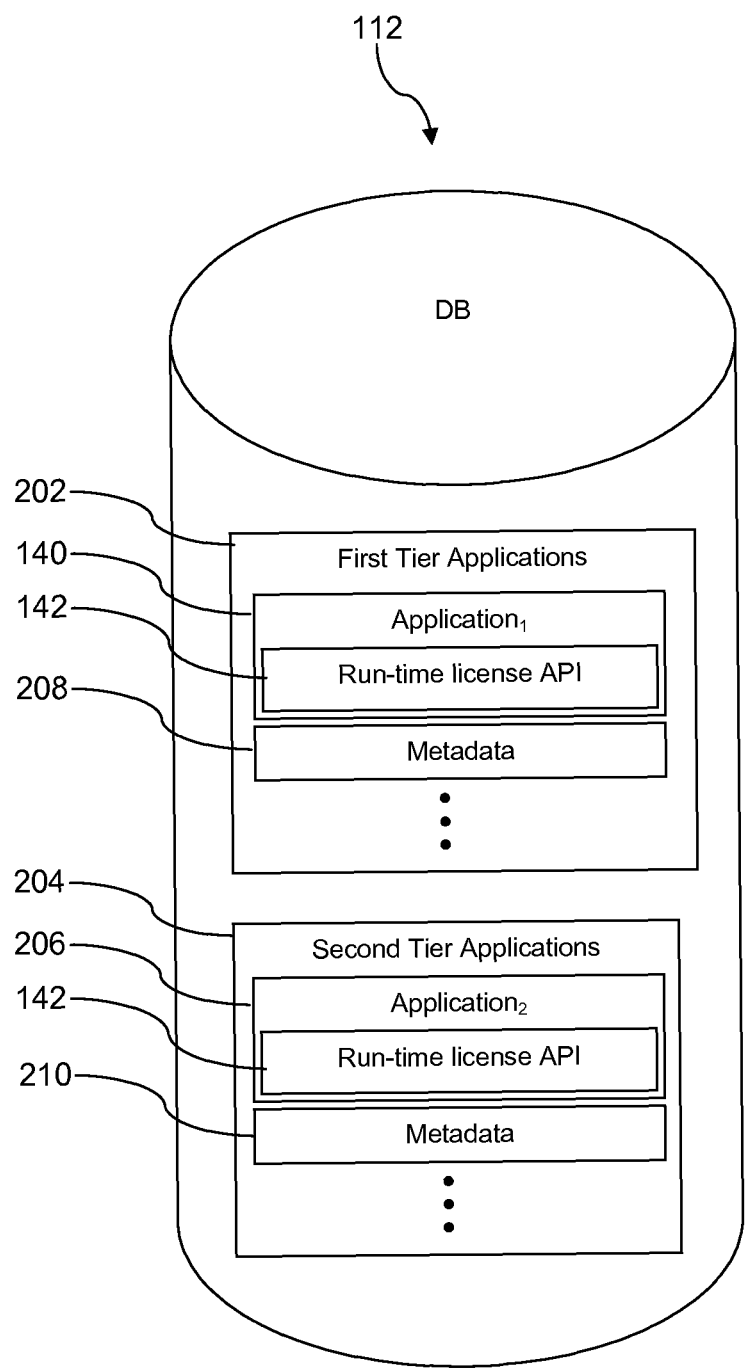
FIG. 2 is a block diagram of an application repository data store according to an embodiment of the disclosure.

Turning now to FIG. 2, the data store 112 is discussed. The data store 112 may comprise a plurality of first tier applications 202 and a plurality of second tier applications 204. In some cases, an application may play the role of both a first tier application 202, for example when an electronic device 106, 108 installs the subject application for standalone execution, and a second tier application 204, for example when another application embeds and invokes the subject application. The first application 140 may comprise one of the first tier applications 202. A second application 206 may comprise one of the second tier applications 202. Both the first application 140 and the second application 206 may embed a call to the run-time license application programming interface 142. The first application 140 may be associated by the data store 112 with a first metadata 208, and the second application 206 may be associated by the data store 112 with a second metadata 210. As described above, the metadata may comprise a variety of information including, but not limited to, a billing model, a revenue share model, statistics associated with the subject application, review information, installation instructions, lists of target electronic devices, and other information.

Figure 3:
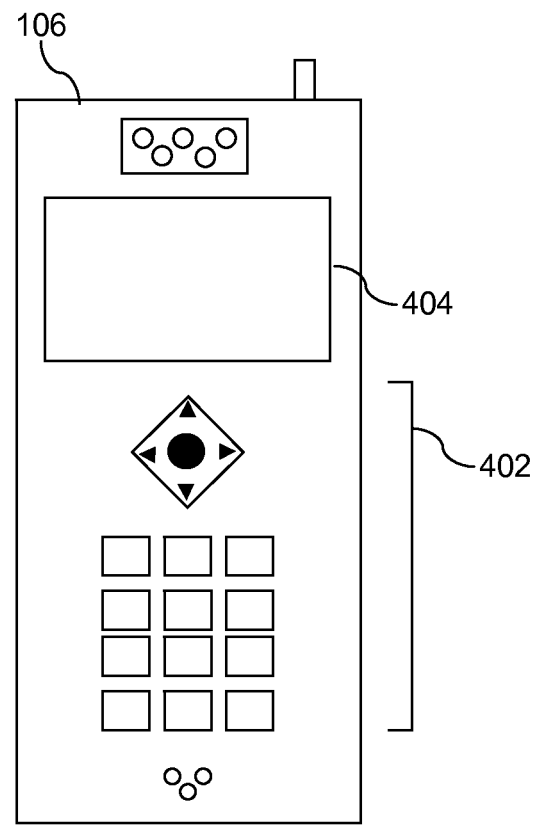
FIG. 3 is an illustration of an electronic device according to an embodiment of the disclosure.

FIG. 3 illustrates an embodiment of the first electronic device 106 as a mobile phone, which is operable for implementing some embodiments of the present disclosure, but the present disclosure should not be limited to these implementations. The first electronic device 106 may take various forms including a wireless handset, a pager, a personal digital assistant (PDA), a gaming device, an inventory control device, a media player, a digital camera, or a digital calculator. Many suitable handsets combine some or all of these functions. In some embodiments of the present disclosure, the first electronic device 106 is not a general purpose computing device like a portable, laptop or tablet computer, but rather is a special-purpose communications device such as a mobile phone, wireless handset, pager, or PDA. The first electronic device 106 may support specialized activities such as gaming, inventory control, job control, and/or task management functions, and so on.

The first electronic device 106 includes a display 402 and a touch-sensitive surface and/or keys 404 for input by a user. The first electronic device 106 may present options for the user to select, controls for the user to actuate, and/or cursors or other indicators for the user to direct. The first electronic device 106 may further accept data entry from the user, including numbers to dial or various parameter values for configuring the operation of the handset. The first electronic device 106 may further execute one or more software or firmware applications in response to user commands. These applications may configure the first electronic device 106 to perform various customized functions in response to user interaction. Additionally, the first electronic device 106 may be programmed and/or configured over-the-air, for example via the base transceiver station 114, a wireless access point, or a peer first electronic device 106.

The first electronic device 106 may execute a web browser application which enables the display 402 to show a web page. The web page may be obtained via communication with a content server 146 at least partially over the wireless communications link provided by the base transceiver station 114, by a wireless network access node, by a peer first electronic device 106 or by any other wireless communication network or system.

Figure 4:
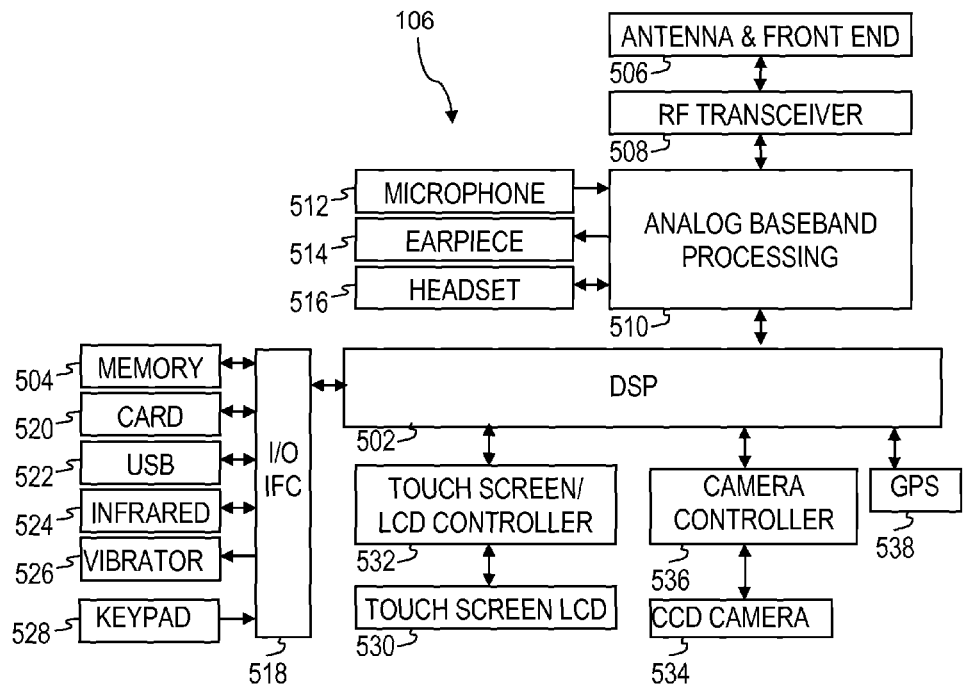
FIG. 4 is a block diagram of an electronic device according to an embodiment of the disclosure.

FIG. 4 shows a block diagram of the first electronic device 106. While a variety of known components of handsets 106 are depicted, in an embodiment a subset of the listed components and/or additional components not listed may be included in the first electronic device 106. The first electronic device 106 includes a digital signal processor (DSP) 502 and a memory 504. As shown, the first electronic device 106 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the first electronic device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the first electronic device 106 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the first electronic device 106 to send and receive information from a radio access network (RAN) or some other available wireless communications network or from a peer first electronic device 106. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the first electronic device 106 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the first electronic device 102 to function as a peripheral device to exchange information with a personal computer or other computer system. The infrared port 524 and other optional ports such as a Bluetooth interface or an IEEE 802.11 compliant wireless interface may enable the first electronic device 106 to communicate wirelessly with other nearby handsets and/or wireless base stations.

The input/output interface 518 may further connect the DSP 502 to the vibrator 526 that, when triggered, causes the first electronic device 106 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the first electronic device 106. Another input mechanism may be the touch screen LCD 530, which may also display text and/or graphics to the user. The touch screen LCD controller 532 couples the DSP 502 to the touch screen LCD 530.

The CCD camera 534 enables the first electronic device 106 to take digital pictures. The DSP 502 communicates with the CCD camera 534 via the camera controller 536. The GPS sensor 538 is coupled to the DSP 502 to decode global positioning system signals, thereby enabling the first electronic device 106 to determine its position. In another embodiment, a camera operating according to a technology other than charge coupled device cameras may be employed. Various other peripherals may also be included to provide additional functions, e.g., radio and television reception.

Figure 5:
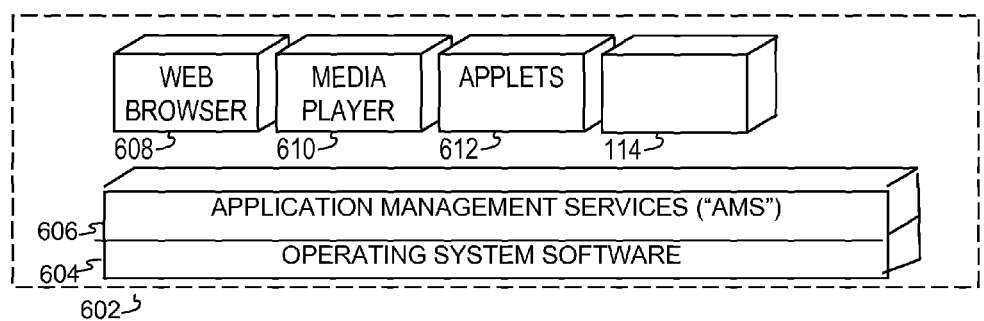
FIG. 5 is a block diagram of a software architecture for an electronic device according to an embodiment of the disclosure.
Figure 6:
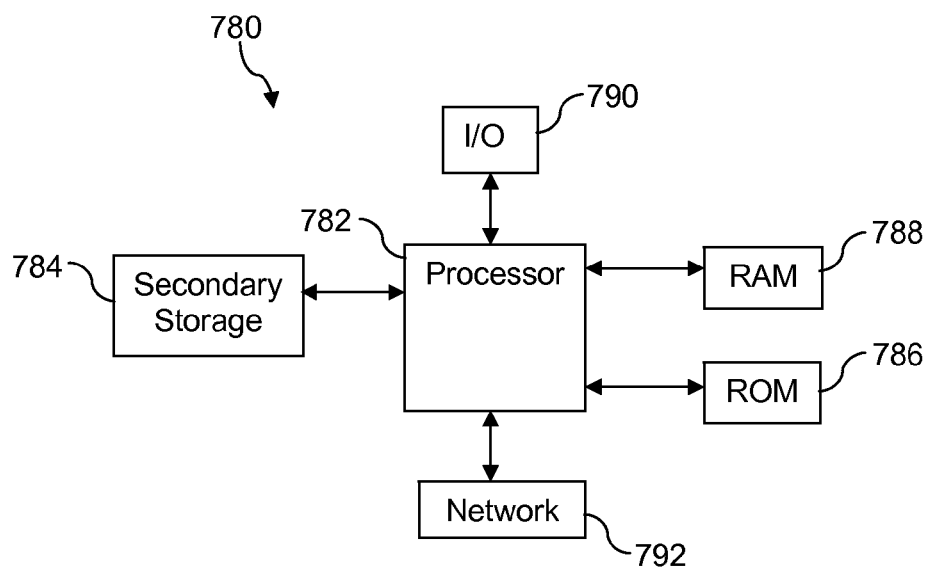
FIG. 6 illustrates an exemplary computer system suitable for implementing the several embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the first electronic device 106. Also shown in FIG. 6 are a web browser application 608, a media player application 610, and JAVA applets 612. The web browser application 608 configures the first electronic device 106 to operate as a web browser, allowing a user to enter information into forms and select links to retrieve and view web pages. The media player application 610 configures the first electronic device 106 to retrieve and play audio or audiovisual media. The JAVA applets 612 configure the first electronic device 106 to provide games, utilities, and other functionality.

FIG. 6 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An application repository, comprising:
   a data store device;
   a plurality of applications stored in the data store device, each application containing an instruction to invoke a run-time license tracking application programming interface (API), the plurality of applications comprising a first application that is a first tier application and a second application that is a second tier application, wherein the first tier application is an application that is selectable by an end user to deploy on an electronic device and the second tier application is an application that is embedded within or called from the first tier application;
   a first computer communicatively coupled to the data store device, the first computer comprising:
   a processor;
   a non-transitory memory;
   a discovery application stored in the non-transitory memory that, when executed by the processor configures at least the processor to, provide an API that promotes developers researching the capabilities of the plurality of the applications stored in the data store device and building applications composed of one or more of the plurality of applications; and a billing apportionment module stored in the non-transitory memory that, when executed by the processor configures at least the processor to:

receive a first run-time license tracking report generated by invocation of the run-time license tracking API by the first application executing on one of a second computer and a mobile electronic device, wherein the first run-time license tracking report identifies the first application as the first tier application, determine a first application usage fee to bill to an account associated with a user of the first application, bill the first application usage fee to the account associated with the user of the first application, determine a first usage fee share based in part on the first application usage fee and on the first run-time tracking report, transfer the first usage fee share to an account associated with the first application, receive a second run-time license tracking report generated by invocation of the run-time license tracking API by the second application executing on one of the second computer and the mobile electronic device, wherein the second run-time license tracking report identifies the second application as the second tier application, and wherein the first usage fee share is further determined based in part on the second run-time tracking report, determine a second usage fee share based in part on the first application usage fee, on the first run-time tracking report, and on the second run-time tracking report, and transfer the second usage fee share to an account associated with the second application, wherein the second application further functions as the first tier application when deployed by the end user for stand-alone execution.

2. The application repository of claim 1, wherein the discovery application further searches the data store device for an application that one of correlates with a keyword associated with the application and correlates with a name associated with the application.

3. The application repository of claim 1, wherein the mobile electronic device is one of a mobile phone, a personal digital assistant (PDA), and a media player.

4. The application repository of claim 1, wherein at least some of the applications stored in the data store device are configured to be associated with a first rating based on user reviews.

5. The application repository of claim 1, wherein at least some of the applications stored in the data store device are configured to be associated with a second rating based on application developer reviews.

6. The application repository of claim 1, wherein at least some of the applications stored in the data store device are configured to be associated with a number of invocations.

7. The application repository of claim 1, wherein the first application is of a first tier, wherein the plurality of applications comprises a second application of a second tier, wherein the billing apportionment module, when executed by the processor, receives a second run-time license tracking report generated by invocation of the run-time license tracking application programming interface by the second application executing on one of the second computer and the mobile electronic device, and wherein the second run-time license tracking report identifies the first application as having invoked the second application.

8. The application repository of claim 1, wherein the first application is configured to invoke the second application.

9. The application repository of claim 1, wherein the plurality of applications are configured to execute on fourth generation wireless electronic devices.

10. The application repository of claim 1, wherein the first and second applications are configured to execute on the mobile electronic device and wherein the second application interacts with a wireless communication network to determine a location of the mobile electronic device.

11. The application repository of claim 1, further comprising an application revenue reporting module stored in the memory that, when executed on the processor, analyzes usage fees transferred to accounts associated with the plurality of applications, creates a report on the top ten revenue generating applications among the plurality of applications, and publishes the report for access by developers in the data store device.

12. The application repository of claim 1, further comprising a run-time analysis module that, when executed by the processor, receives at least a portion of the first run-time license tracking report from the billing apportionment module and analyzes the portion of the first run-time license tracking report to one of refine a user profile associated with the second computer or the mobile electronic device and to accumulate marketing statistics.

13. The application repository of claim 12, wherein the run-time analysis module accumulates statistics on revenue associated with at least some of the plurality of applications stored in the data store device.

14. The application repository of claim 12, wherein the run-time analysis module accumulates statistics on the frequency of execution of at least some of the plurality of applications stored in the data store device.

15. The application repository of claim 12, wherein the run-time analysis module accumulates statistics on how many different applications call at least some of the plurality of applications stored in the data store device.

16. The application repository of claim 1, wherein at least some of the plurality of applications are configured for execution on one of a worldwide interoperability for microwave access (WiMAX) mobile phone and a long-term evolution (LTE) mobile phone.

17. The application repository of claim 1, wherein at least some of the plurality of applications are configured for execution on a long-term evolution mobile phone.

18. The application repository of claim 1, wherein at least some of the plurality of applications are configured for execution on one of a desktop computer and a laptop computer.

* * * * *